United States Patent [19]

Van Sickle

[11] 4,238,875
[45] Dec. 16, 1980

[54] METHOD OF AND APPARATUS FOR PERFORMING WORK FUNCTIONS ON ARTICLES FROM OPPOSITE ENDS OF THE ARTICLES

[75] Inventor: Robert J. Van Sickle, Richmond, Va.

[73] Assignee: Rail Bearing Service, Richmond, Va.

[21] Appl. No.: 20,731

[22] Filed: Mar. 15, 1979

[51] Int. Cl.³ .............................................. B23P 19/02
[52] U.S. Cl. .............................. 29/148.4 S; 29/426.2; 29/724; 29/785; 29/792
[58] Field of Search ................... 29/148.4 A, 148.4 R, 29/148.4 L, 148.4 S, 149.5 R, 426, 427, 429, 430, 469, 453, 711, 724, 742, 759, 760, 783, 785, 789, 792, 793, 797

[56] References Cited

U.S. PATENT DOCUMENTS

| | | | |
|---|---|---|---|
| 608,611 | 8/1898 | Klahn | 29/785 X |
| 1,723,369 | 8/1929 | Pew | 29/724 |
| 1,991,723 | 2/1935 | Betz | 29/148.4 S |
| 2,172,145 | 9/1939 | Rehnberg | 29/724 |
| 2,586,087 | 2/1952 | Reynolds et al. | 29/724 X |
| 3,088,198 | 5/1963 | Svenson | 29/785 X |
| 3,553,815 | 1/1971 | McElvy | 29/785 X |
| 3,579,785 | 5/1971 | Hellborg | 29/785 |
| 3,729,789 | 5/1973 | Otto | 29/148.4 S |

*Primary Examiner*—Milton S. Mehr
*Attorney, Agent, or Firm*—Richard P. Matthews

[57] ABSTRACT

A method of and apparatus for performing work functions on articles from opposite ends of the articles with the aid of twin turrets which present top and bottom datum surfaces. Articles to be work processed are fed to a fixed surface beneath the bottom datum surface of a first turret then lifted and held for rotation therewith. Each turret is indexed sequentially and stationary work holder platforms permit the completion of work functions on a repetitive basis from opposite ends of the articles first from the bottom of the article on the first turret and then from the top of the article after transfer is made to the second turret. The invention is specifically illustrated with respect to the assembly, sealing and lubrication of tapered roller bearings as used in railroad rolling stock.

27 Claims, 10 Drawing Figures

METHOD OF AND APPARATUS FOR PERFORMING WORK FUNCTIONS ON ARTICLES FROM OPPOSITE ENDS OF THE ARTICLES

This invention relates to a method of and apparatus for performing work functions on articles from opposite ends of the articles and, more particularly, to such a method and apparatus which employs twin turrets having top and bottom datum surfaces.

Heretofore when articles have had to be assembled or work functions performed on articles from opposite ends of the article such as tapered roller bearings as used in railroad rolling stock, it has been customary to turn the article over after completing an operation at one end so that the other end could be worked upon. While this procedure may not be too objectionable when the article is light and easily handled, such as in the manufacture of tin cans or the like, the process is substantially less desirable when the article is either bulky or heavy or both bulky and heavy. For example, in the re-manufacture or re-conditioning of tapered roller bearing assemblies where the assembled product weighs 80 pounds or more and the shell or cup weighs 40 to 60 pounds, we have a situation where turning over the article to perform a work function is not very practical. In fact, the problem is so difficult that it is the predominating custom to handle the elements of the tapered roller bearing assemblies with substantially manual operations. This situation has resulted in unnecessarily high labor costs in the re-manufacture and re-conditioning of tapered roller bearings.

The present invention effectively overcomes the foregoing disadvantages and solves the material handling problems encountered. Moreover, the invention is applicable to the handling of many articles which require work functions, including assembly operations, at opposite ends of an article.

In particular, the present invention comprises a method of and apparatus for performing work functions on opposite ends of the articles with the aid of twin turrets which present top and bottom datum surfaces. Articles to be work processed are fed to a fixed surface beneath the bottom datum surface of a first turret, then lifted and held for rotation therewith. Each turret is indexed sequentially and stationary work holder platforms permit the completion of work functions on a repetitive basis from opposite ends of the articles first from the bottom of the article on the first turret and then from the top of the article after transfer is made to the second turret. A specific, but non-limiting, example of the invention is made with respect to the assembly, sealing and lubrication of tapered roller bearings.

For an appreciation of the basic concepts of the present invention, reference is made to the following principal method steps of the invention:

a. articles are conveyed serially to a first work station beneath a bottom datum surface on a first of two turrets which is elevated with respect to a second turret;
b. the article is lifted and held so that it travels with and is associated with the bottom datum surface;
c. the article is indexed sequentially with the first turret to a series of pre-programmed work stations;
d. work functions are performed on the article from beneath the article at these work stations;
e. the article is transferred to a top datum surface on the second turret;
f. the article is indexed sequentially with the second turret to another series of pre-programmed work stations;
g. work functions are performed on the article from above the article at this second series of work stations;
h. the article is removed from the second turret.

In addition to the above steps, it is preferred to make the transfer from one turret to another as easy as possible, and this is usually accomplished by overlapping the paths of the turrets so that transfer may be made vertically at the overlapping position. The turrets themselves may be equipped with special holding, lifting or receiving tools and fixtures as the nature of the article demands or permits.

The inherent advantages and improvements of the present invention will become more apparent upon reference to the detailed description of a preferred embodiment and by reference to the accompanying drawings wherein.

Figure 1:
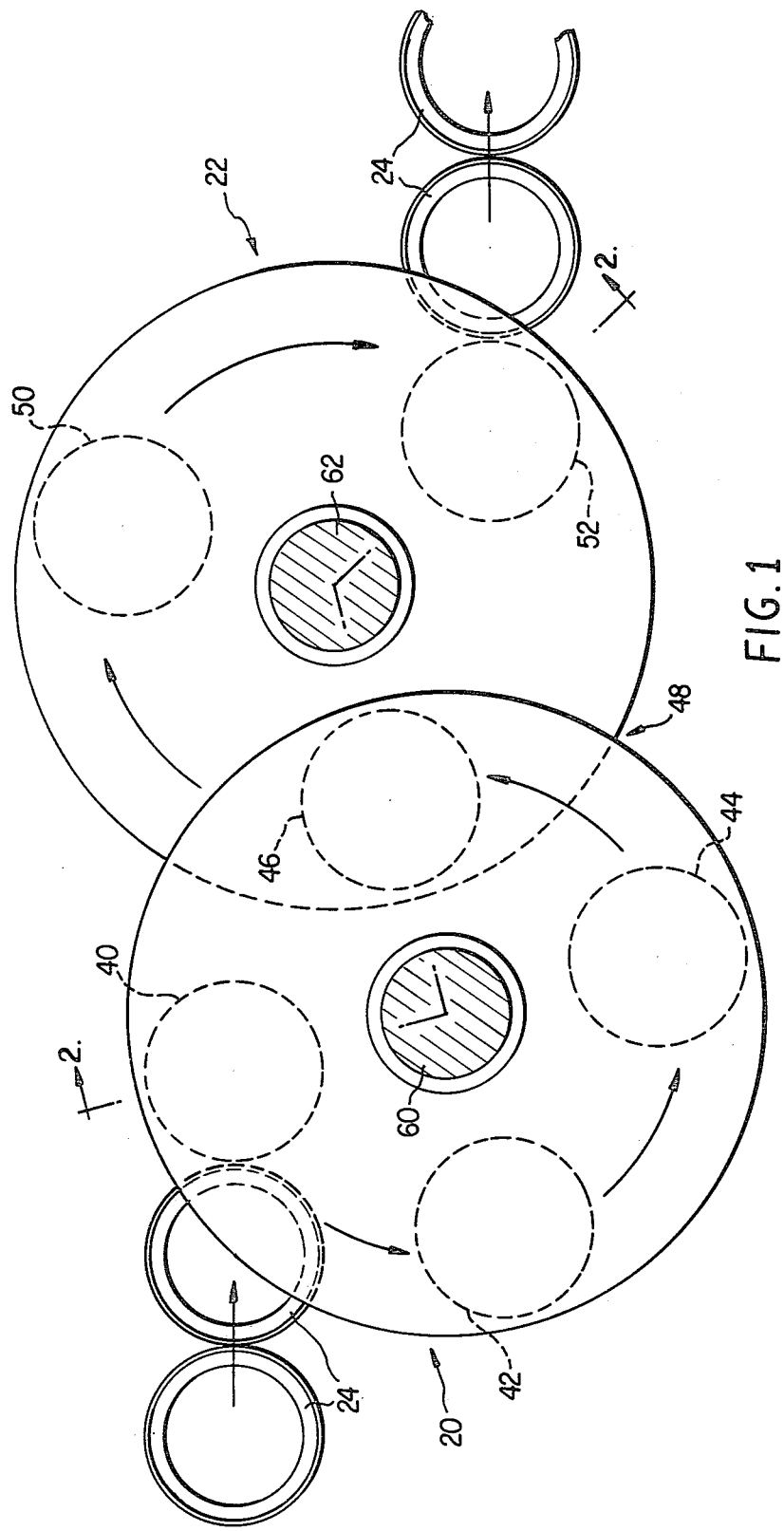
FIG. 1 is a top plan view, schematic in nature and taken in horizontal cross section, illustrating the turret arrangement of the present invention.

Referring now to FIG. 1 of the drawings, a first turret is indicated generally at 20 and a second turret is indicated generally at 22. Articles 24 are conveyed seriatim by any suitable means such as by a conveyor, not shown, to the first turret to be work processed.

Figure 3:
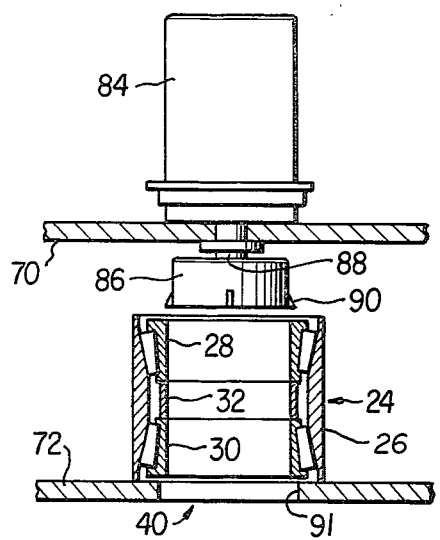
FIGS. 3 and 4 are fragmentary elevational views, taken partially in vertical cross section, showing two positions for an article at the first station of one of the turrets in FIG. 1.

For purposes of identifying representative features of the specific article illustrated, reference is made to FIG. 3 which shows a cross section of a typical and basic tapered roller bearing assembly designated generally in this figure at 24. Thus, the bearing 24 is shown to have a cup 26 which has a cylindrical outer diameter and internal raceways. Received within the raceways are an upper cone assembly 28, a lower cone assembly 30, and a spacer 32 between the two cone assemblies.

Returning now to FIG. 1, the first turret 20 is provided with four stations equally spaced about its periphery. A first station, designated 40, is a loading station, and proceeding counterclockwise in the direction of rotation are two work stations 42, 44 and a transfer station 46. The two turrets are rotated intermittently and sequentially in opposite directions as indicated by the arrows in FIG. 1 by conventional means, not shown. A vertical overlap of the two turrets is designated generally at 48 in FIGS. 1 and 7 and it is in this position that an article is transferred from turret 20 to turret 22.

In addition to a transfer station at 46, turret 22 has two additional stations designated 50 and 52 in FIG. 1. From this it can be seen that the invention is not limited to any given number of work stations per turret nor is there a need for using the same number of stations on each of the twin turrets.

Figure 2:
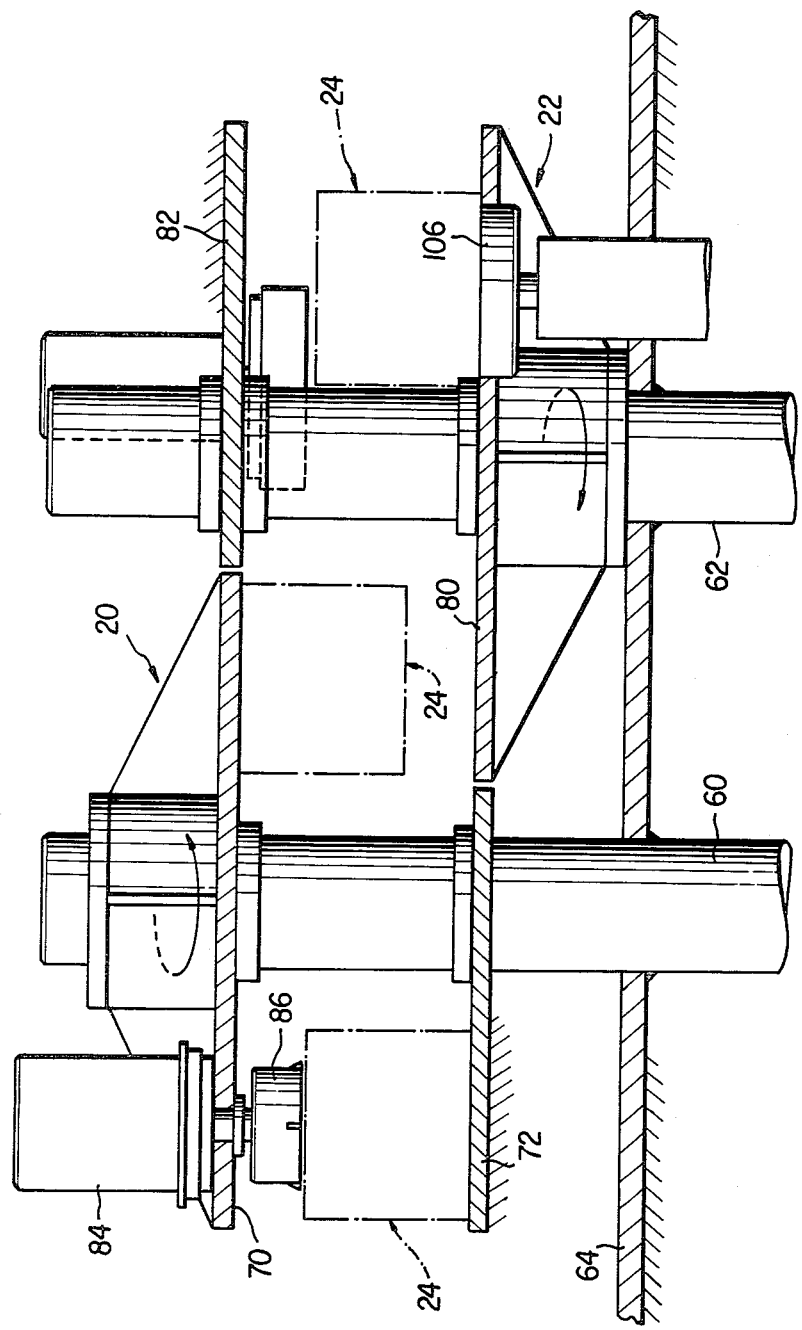
FIG. 2 is an elevational view taken in vertical cross section along line 2—2 of FIG. 1.

Referring now to FIG. 2, main support shafts 60, 62 extend through a frame 64 in order to support turrets 20, 22. As can be seen, turret 20 is at a higher elevation than turret 22 and provides a lower datum surface 70 toward which the articles are lifted and held to be associated therewith. The articles are initially received on a stationary work holder platform means which extends horizontally beneath the lower datum surface 70. Therefore, it is possible to perform work functions on the articles held against or associated with the lower datum surface 70 from beneath the article.

Similarly, turret 22 provides an upper datum surface 80 on which the articles are placed and which has associated therewith a stationary work holder platform means 82. Therefore, it is possible to perform work functions on the articles received on or associated with the upper datum surface 80 from above the article. Each of the horizontally extending work holder platforms 72, 82 are supported from frame 64 by suitable means, not shown.

Figure 4:
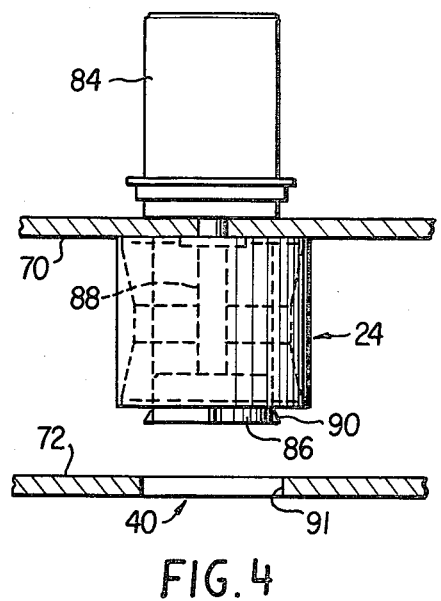

Reference is now made to FIGS. 3 and 4 which illustrate the loading station for the first turret 20. After the articles have been delivered seriatim on the stationary work platform 72 either by conveyor means or by hand, a holding and lifting means 84 is actuated to lift the article against the lower datum surface 70 as illustrated in FIG. 4. In particular, a mandrel 86 on a reciprocable shaft 88 is inserted through a central bore of the article 24. Mandrel 86 has holding means such as extensible and retractable members 90 which engage the bottom surface of lower cone assembly 30, the full insertion of which is made possible by an aperture 91 in stationary platform 72 so that the article may be lifted to the FIG. 4 position.

Figure 5:
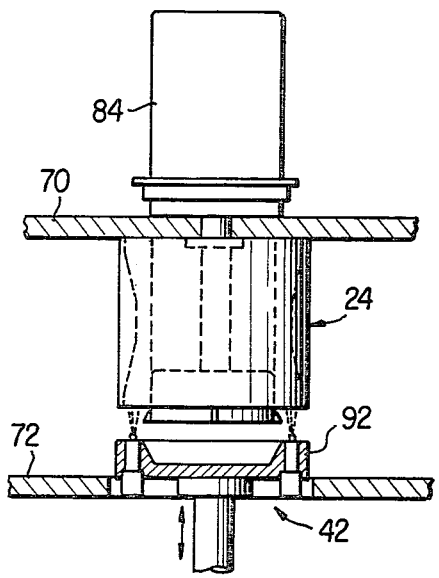
FIGS. 5 and 6 are fragmentary elevational views, taken partially in vertical cross section, showing the performance of work functions at two subsequent stations for the first turret in FIG. 1.

The article remains associated with the lower datum surface 70 as the turret 20 is indexed sequentially to each of its work stations. In FIG. 5, the lower cone assembly is lubricated by a lubricating means 92 which is located at the second station, generally designated 42.

Figure 6:
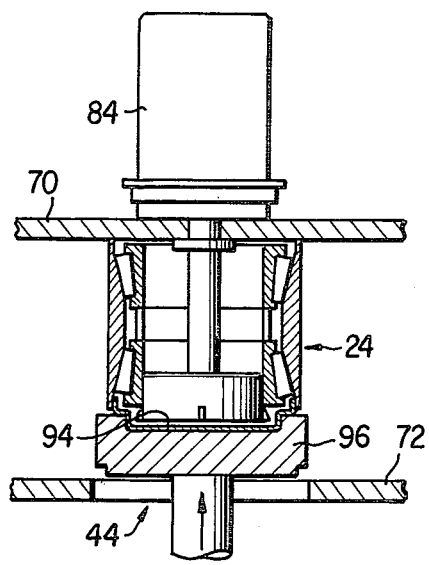

In FIG. 6, the article has reached the third station, indicated generally at 44. At this station, a bottom seal member 94 is seal pressed and located with the aid of a suitable locating seal fixture 96.

Figure 7:
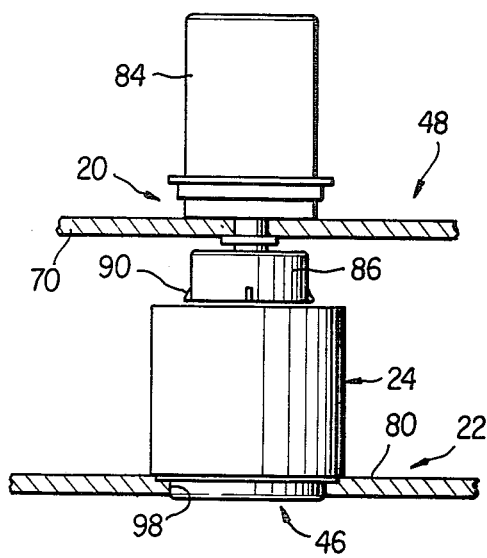
FIG. 7 is a fragmentary elevational view, taken partially in vertical cross section, showing the article transfer station between the two turrets of FIG. 1.

The article 24 is then rotated to the transfer station, generally designated 46 in FIG. 7. At this station, the members 90 have been retracted and mandrel 86 withdrawn from the central bore of the article 24. In so doing, article 24 is deposited by gravity in aperture 98 in upper datum surface 80 of the second turret 22. Aperture 98 is so dimensioned to hold the article snugly so that the article remains associated with the upper datum surface 80 of the second turret 22 until the article is discharged.

Figure 8:
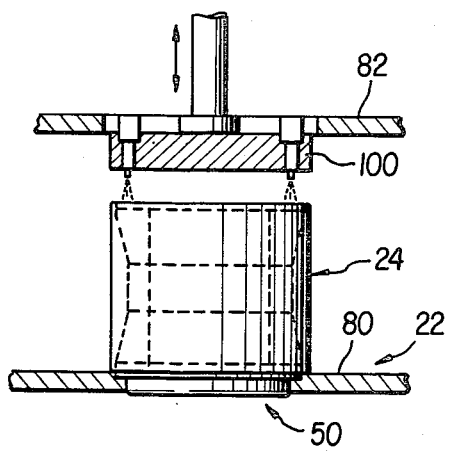
FIG. 8 is a fragmentary elevational view, taken partially in vertical cross section, showing a work station for the second turret.

In FIG. 8, the article 24 has been indexed to the next work station on second turret 22, generally designated 50. At this station, lubricating means 100 lubricates the top cone assembly 28 of the tapered roller bearing.

Figure 9:
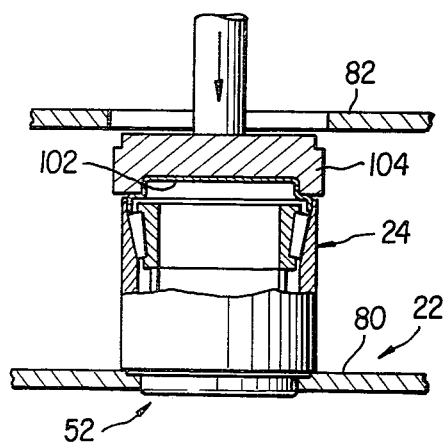
FIG. 9 is a fragmentary elevational view, taken partially in vertical cross section, showing another work station for the second turret.
Figure 10:
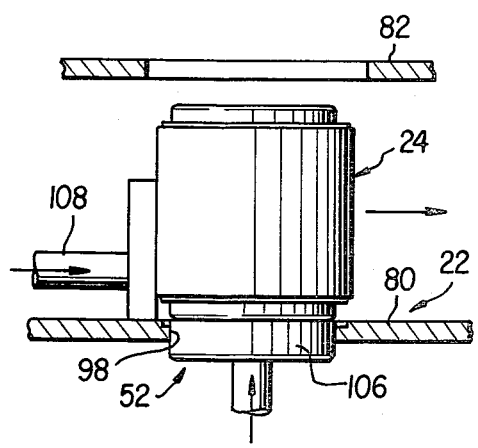
FIG. 10 is a fragmentary elevational view, taken partially in vertical cross section, illustrating the removal of the article from the second turret.

At the next work station, generally designated 52 in FIG. 9, a top seal member 102 is pressed into position by means of a suitable seal pressing and locating seal fixture 104. At this same station, after fixture 104 is removed, an eject ram 106 lifts the article from the pocket provided through aperture 98 and lateral displacement ram 108 removes the article from second turret 22.

A holding and lifting means 84 is positioned at each station of first turret 20 although for ease of illustration only one has been shown. Although rotary motion has been indicated for turrets 20, 22, the invention is also adaptable to rectilinear or other forms of motion.

Although only two turrets have been disclosed, more than two turrets may be employed, especially if the additions of work stations to any one turret makes it too cumbersome. The apparatus may be used to disassemble as well as to assemble articles and this may consist of at least partially disassembling the article. Finally, closure members may be placed on articles in a manner similar to the manner in which sealing members are applied to open ended articles.

While a presently preferred embodiment of the invention has been illustrated and described, it will be recognized that the invention may be otherwise variously embodied and practiced within the scope of the claims which follow.

What is claimed is:

1. A method of performing work functions on articles from opposite ends of said articles with the aid of twin turrets, a first of said turrets being elevated with respect to the second to present a bottom datum surface while the second of said turrets presents a top datum surface, said method comprising the steps of
    a. conveying articles seriatim to a first work station beneath said bottom datum surface,
    b. lifting and holding an article to travel with and be associated with said bottom datum surface,
    c. indexing said article with said first turret,
    d. performing work functions on said article from beneath said article while it is associated with said bottom datum surface,
    e. transferring said article to said top datum surface of said second turret,
    f. indexing said article with said second turret,
    g. performing work functions on said article from above said article while it is on said top datum surface,
    h. and removing said article from said second turret.

2. A method of performing work functions as defined in claim 1 including the steps of
    a. positioning said twin turrets so they overlap,
    b. and transferring said article to said top datum service at said overlapping position.

3. A method of performing work functions as defined in claim 1 including the additional step of lifting said article to travel with and be associated with said bottom datum surface by inserting a mandrel into said article.

4. A method of performing work functions as defined in claim 1 wherein one of said work functions performed consists of lubricating said article.

5. A method of performing work functions as defined in claim 1 wherein one of said work functions performed consists of placing end cover means on said article.

6. A method of performing work functions as defined in claim 1 including the additional step of placing said article in a cavity in said top datum surface.

7. A method of performing work functions as defined in claim 1 wherein one of said work functions performed consists of at least partially assembling said article.

8. A method of performing work functions as defined in claim 1 wherein one of said work functions performed consists of at least partially disassembling said article.

9. A method of performing work functions as defined in claim 2 including the additional step of lifting said article to travel with and be associated with said bottom datum surface by inserting a mandrel into said article.

10. A method of performing work functions as defined in claim 2 wherein one of said work functions performed consists of lubricating said article.

11. A method of performing work functions as defined in claim 2 wherein one of said work functions performed consists of placing end cover means on said article.

12. A method of performing work functions as defined in claim 2 including the additional step of placing said article in a cavity in said top datum surface.

13. A method of performing work functions as defined in claim 2 wherein one of said work functions performed consists of at least partially assembling said article.

14. A method of performing work functions as defined in claim 2 wherein one of said work functions performed consists of at least partially disassembling said article.

15. An apparatus for performing work functions on articles from opposite ends of said articles, said apparatus comprising
   a. first and second turrets having horizontally extending bottom and top datum surfaces respectively,
   b. means for conveying articles serially to a fixed surface beneath said bottom datum surface,
   c. means for indexing each of said turrets sequentially,
   d. means on said first turret for lifting and holding an article for rotation with said first turret,
      (1) said first turret having a plurality of stations at which work functions can be performed,
   e. means for transferring articles from said first turret to said second turret,
   f. and means for removing said articles from said second turret.

16. An apparatus for performing work functions on articles as defined in claim 15 wherein said bottom and top datum surfaces are at different elevations and said turrets are arranged in overlapping relationship whereby said articles can be transferred from said first turret to said second turret at said overlapping position.

17. An apparatus for performing work functions on articles as defined in claim 16 wherein said second turret is provided with a plurality of work stations.

18. An apparatus for performing work functions on articles as defined in claim 16 including stationary work holder platform means positioned beneath said bottom datum surface of said first turret from which repetitive work functions are performed from beneath said articles.

19. An apparatus for performing work functions on articles as defined in claim 17 including stationary work holder platform means positioned above said top datum surface of said second turret from which repetitive work functions are performed from above said articles.

20. An apparatus for performing work functions on articles as defined in claim 15 wherein said means on said first turret for lifting and holding an article for rotation with said first turret consists of a mandrel.

21. An apparatus for performing work functions on articles as defined in claim 20 wherein said mandrel is inserted entirely through said article and is provided with expansible means for engagement with the bottom of said article.

22. An apparatus for performing work functions on articles as defined in claim 20 including stationary work holder platform means positioned beneath said bottom datum surface of said first turret from which repetitive work functions are performed from beneath said articles.

23. An apparatus for performing work functions on articles as defined in claim 19 including stationary work holder platform means positioned beneath said bottom datum surface of said first turret from which repetitive work functions are performed from beneath said articles.

24. An apparatus for performing work functions on articles as defined in claim 17 wherein said top datum surface of said second turret is provided with a plurality of apertures to hold said articles.

25. An apparatus for performing work functions on articles as defined in claim 24 wherein said means on said first turret for lifting and holding an article for rotation with said first turret consists of a mandrel.

26. An apparatus for performing work functions on articles as defined in claim 25 including stationary work holder platform means positioned beneath said bottom datum surface of said first turret from which repetitive work functions are performed from beneath said articles.

27. An apparatus for performing work functions on articles as defined in claim 26 including stationary work holder platform means positioned above said top datum surface of said second turret from which repetitive work functions are performed from above said articles.

* * * * *